Aug. 11, 1953
W. E. LLOYD
2,648,606
METHOD FOR DECREASING EGG WHITE WHIPPING TIME
Filed Sept. 10, 1949
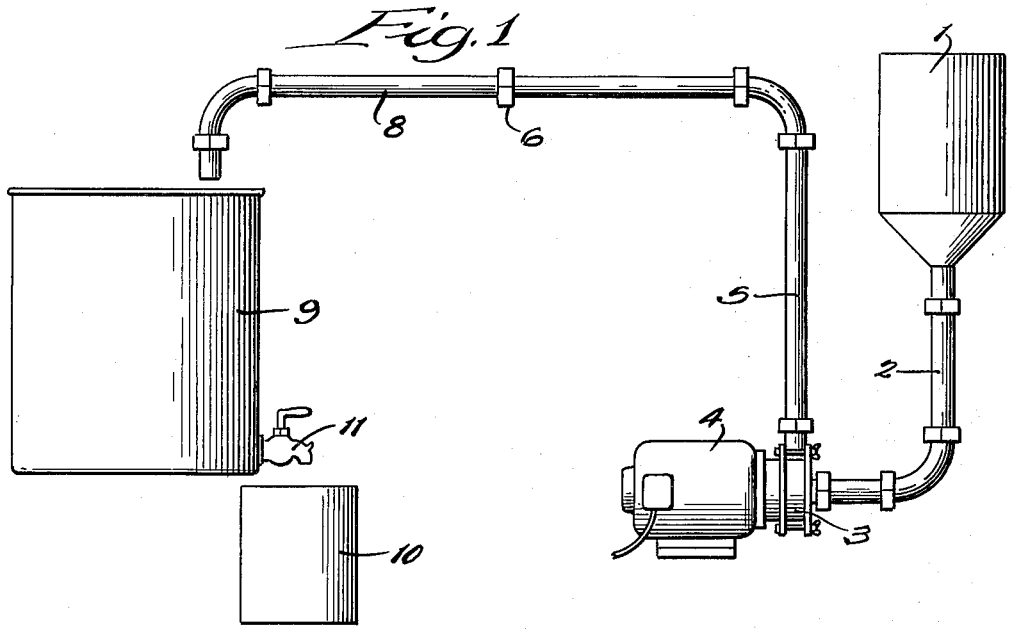
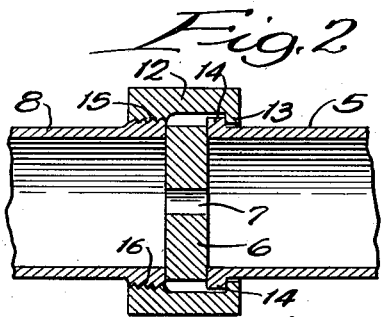
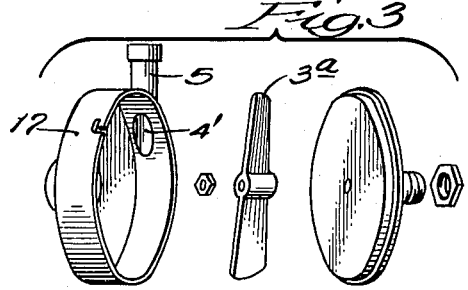
INVENTOR:
William E. Lloyd,
BY Carl C. Batz
ATTORNEY.

Patented Aug. 11, 1953

2,648,606

UNITED STATES PATENT OFFICE 2,648,606

METHOD FOR DECREASING EGG WHITE WHIPPING TIME

William E. Lloyd, Homewood, Ill., assignor to Armour and Company, Chicago, Ill., a corporation of Illinois Application September 10, 1949, Serial No. 114,947

2 Claims. (Cl. 99—113)

This invention relates to a method for decreasing egg white whipping time.

Egg whites are employed in almost every recipe for bread, cake, meringue, and high-grade confectionery. The primary function of the egg white is to incorporate air into the dough or other mass when the same is whipped. In baked materials, the heat coagulated egg protein serves not only to give shape to the dough, but also acts as a binder and prevents a crumbly texture.

Various suggestions have been made in the literature for improving the whipping time, stability, and foam volume of liquid or dried egg whites. However, the suggested methods involve extremely expensive apparatus or else have been ineffective as methods for decreasing the whipping time.

It is already well established that the time required to whip a meringue to within a definite specific gravity bears a direct relation to the cake volume, tensile strength and palatability of a cake baked according to a standard recipe. It has been observed that the longer the whipping time, the higher will be the tensile strength and the lower the palatability score. Further, commercial bakers and confectioners have long been demanding an egg white product which can be more rapidly whipped.

As fresh eggs are received daily by egg breaking and separating plants throughout the country, it is well recognized that the viscosity of the whites vary from egg to egg. This difference is so noticeable that the terms "thick whites" and "thin whites" are now used as a common expression in scientific reports.

Basically, the viscosity of egg whites is dependent upon their mucin content. Mucin is a glycoprotein found in egg whites in the form of a fibrous substance. The thick or firm whites possess these fibers in abundance. Microscopically, they appear to be in a highly swollen form. The thin whites, on the other hand, have fewer, less distinct, mucin fibers. It is this difference in mucin content which accounts for certain other differences in physical properties aside from the viscosity. Foremost among these is the whipping time. It has been found that the thick whites require a much longer whipping time than the thin whites. This is probably due to the fact that the gross colloidal structure must first be broken up, and, in so doing, the mucin fibers are altered. Apparently, the greater the number of fibers, the longer time it will take to sufficiently alter them.

Thus far, attempts to reduce the viscosity of egg whites have been concerned with chemical and physical treatments. The chemical treatment has, in the main involved treating the whites with acids of an edible nature. This lowers the viscosity but does not result in a uniform product having a decreased whipping time under a variety of conditions, such as, aging, temperature differences in different baking shops, storage temperatures, etc.

The physical means employed have been complicated and rather expensive machines, and no one has been heretofore successful in reducing the whipping time of egg whites with extremely simple apparatus.

An object of the present invention is to provide a method of extremely simple steps whereby the whipping time of egg whites can be greatly reduced without substantially increasing the processing expense. A further object is to provide a method for reducing the whipping time of egg whites while increasing the palatability of the baked product in which the whipped whites are incorporated. A still further object is to provide in combination with a centrifugal pump, an orifice of specific and critical dimensions which reduces the whipping time of egg whites. Other specific objects and advantages will appear as the specification proceeds.

The new method may be carried out in various types of apparatus and for the purpose of illustrating, one form of such apparatus is set out in the accompanying drawing, in which—

Fig. 1 is a diagrammatic view showing apparatus in which the method may be practiced; Fig. 2 is a broken detail sectional view of the orifice plate secured in the pump outlet conduit; and Fig. 3 is a perspective view of the pump parts which may be employed, the parts being as shown in separated relation.

In one embodiment of the process, a quantity of mixed thick and thin egg whites are dropped into tank 1 and pass by gravity through to pipe 2, and to the intake of the propeller blade equipped centrifugal pump 3. In the specific illustration given, the blade 3a is fixed to the shaft of motor 4. Within the casing of the pump, the egg whites are engaged by the propeller blade and are passed upwardly through a port 4' into pipe 5. In pipe 5 is located an orifice plate 6, as shown more clearly in Fig. 2. The orifice plate is provided centrally with an orifice 7 through which the egg whites are passed before being discharged into pipe 8 which thus forms a continuation of pipe 5. Pipe 8 discharges into container 9 or into any other suitable receiver. If desired, a vessel 10 may be supported below a valve equipped discharge spout 11.

The orifice plate 6 is in the form of a circular metal plate of substantial thickness and having an outside diameter approximating that of pipe 5. A coupler nut 12 is provided on one side with a flange 13 which engages a collar 14 with which the end of pipe 5 is provided and the other end of the coupler nut is provided with threads 15 which engage a threaded collar 16 carried by pipe 8. As already indicated, there is bored through the middle of the plate 6, a hole 7, of the desired diameter. If desired, there may be inserted in the pipe 5, a constricted glass tube or sight glass, which enables the operator to determine the shear effect on egg whites passing through the pipe.

The centrifugal pump may be of any suitable construction. I prefer to employ a propeller blade 3a which is adapted to be mounted directly upon the drive shaft of motor 4 and which is equipped with edges adapted to be brought into contact with the egg whites to exert a shearing effect thereon. I prefer a pump in which the edges of the propeller blade when inside the casing are close to the interior walls of a circular pump housing 17.

The propeller exerts a hashing action on the egg whites that come in contact with it and is partially effective in the disintegration of the gross colloidal structure of the whites. However, without the cooperation of the restraining orifice in the pipe line, the pump is in itself ineffective in reducing the whipping time of the egg whites.

I have discovered that there is a critical orifice size which in cooperation with the centrifugal pump decreases the whipping time of egg whites. Extremely small orifices such as are employed in homogenizers are ineffective in decreasing the whipping time and often increase the whipping time. Further, when the orifice size is in the neighborhood of $10/16$ of an inch, the whipping time is not decreased. Between these limits, and preferably in the range of $1/8$ of an inch to $1/6$ of an inch, I find that there is a substantial decrease in the whipping time of egg whites. Best results were secured when the orifice was a $3/16$ inch orifice. By using such an orifice, the whipping time was decreased from nine minutes to four minutes. I prefer not to employ an orifice below $1/16$ of an inch because this takes the process outside the limits of a practical range for continuous egg treatment under conditions which have been described. A $5/16$ inch orifice gave a whipping time of 5½ minutes and a $1/16$ orifice gave a whipping time of 7 minutes. A $10/16$ inch orifice gave a whipping time of 10 minutes which was the same time required for the untreated sample (control). A $1/16$ inch orifice gave a whipping time of 4 minutes but the volume was considerably smaller than that processed through the $3/16$ inch orifice and there was no saving in whipping time.

In the process I believe that the new results are achieved through the joint effect of the centrifugal pumping blade which hashes the egg whites and the orifice plate which exerts a back pressure upon the material in the pump chamber. A typical centrifugal pump has been shown in the drawing but it will be understood that other propeller pumps equipped with a rotating blade may be used for accomplishing the purposes described.

Why the selected orifice is effective in reducing the whipping time of egg whites while much smaller orifices are ineffective for this purpose and larger orifices in excess of $10/16$ inch are also ineffective, I am not able to state. It seems clear, however, from the tests which I have made employing orifices of different dimensions that there is a critical range of orifice dimensions which for some reason or other greatly reduce the whipping time of liquid egg whites.

Specific examples of my process may be set out as follows:

Example 1

A batch of fresh egg whites was tested first to determine the whipping time thereof in order to arrive at a proper consistency for angel food cake baking. The tests showed that 9 minutes were required to bring the eggs to such consistency. A portion of the eggs was then passed through a $3/16$ inch orifice in accordance with the process described above and the product was then whipped and employed in the baking of an angel food cake. The whipping time to reach the above desired consistency was cut down to three minutes. Further, the palatability of the angel food cake was higher than the cake baked with the untreated eggs after they had been whipped for 9 minutes.

Example 2

Mixed egg whites which have been frozen were tested to determine the proper consistency for angel food cake baking and the whipping time was found to be 10 minutes. A test cake was made with the control sample. When a portion of the same batch was passed through a $3/16$ inch orifice by means of a centrifugal pump in accordance with the description above set out, the whipping time of the eggs thus treated was found to be four minutes. The angel food cake baked with the treated eggs was found to have greater palatability than the cake baked with the control sample.

Example 3

Mixed fresh egg whites were checked for whipping time and it was found that 10 minutes were required for bringing the eggs to the desired consistency for an angel food cake. A portion of the untreated eggs was then passed through a $5/16$ inch orifice in the type of apparatus already described and the whipping time of the product was found to be 5½ minutes. A highly palatable angel food cake was prepared from the egg product.

The process is one which utilizes the equipment already existing in most plants and actually requires only a slight alteration in the pipe line for the insertion of an inexpensive orifice plate. Insertion of such a plate for an orifice of the dimensions already described results in a product in which the whipping time may be reduced from 9 or 10 minutes to 3 or 4 minutes at substantially no increase in cost.

While in the foregoing specification I have set out certain steps of the process in considerable detail for the purpose of embodiment of the invention, it will be understood that such details may be varied widely by those skilled in the art without departing from the spirit of my invention.

I claim:

1. In a process for treating raw egg whites, the step of hashing the egg white material within a chamber filled with said material while simultaneously forcing said material from said chamber through an orifice having a diameter of from $\frac{1}{16}$ to $\frac{7}{16}$ inch to create a back pressure on the material in said chamber sufficient to make said hashing effective in decreasing the required length of time to whip said egg whites.

2. In a process for treating raw egg whites, the step of hashing the egg white material within a chamber filled with said material while simultaneously forcing said material from said compartment through an orifice having a diameter of $\frac{3}{16}$ inch to create a back pressure on the material in said chamber sufficient to make said hashing effective in decreasing the required length of time to whip said egg whites.

WILLIAM E. LLOYD.

References Cited in the file of this patent

UNITED STATES PATENTS

| Number | Name | Date |
| --- | --- | --- |
| 2,139,696 | Reynolds | Dec. 13, 1938 |
| 2,151,760 | Harris | Mar. 28, 1939 |